US007372228B2

(12) United States Patent
Hahn et al.

(10) Patent No.: US 7,372,228 B2
(45) Date of Patent: May 13, 2008

(54) ELECTRIC POWER TOOL WITH MEMORY CAPABILITY

(75) Inventors: Dietmar Hahn, Gerlingen (DE); Aldo Di Nicolantonio, Recherswil (CH)

(73) Assignee: Robert Bosch GmbH, Stuttgart (DE)

( * ) Notice: Subject to any disclaimer, the term of this patent is extended or adjusted under 35 U.S.C. 154(b) by 164 days.

(21) Appl. No.: 10/557,935

(22) PCT Filed: Nov. 24, 2004

(86) PCT No.: PCT/DE2004/002605

§ 371 (c)(1),
(2), (4) Date: Nov. 22, 2005

(87) PCT Pub. No.: WO2005/070625

PCT Pub. Date: Aug. 4, 2005

(65) Prior Publication Data

US 2007/0069671 A1 Mar. 29, 2007

(30) Foreign Application Priority Data

Jan. 22, 2004 (DE) ...................... 10 2004 003 191

(51) Int. Cl.
*B25B 23/151* (2006.01)
*H02P 7/00* (2006.01)

(52) U.S. Cl. ...................... 318/432; 318/434; 318/139; 388/815; 388/930; 388/937; 173/5; 173/176

(58) Field of Classification Search ..................... None
See application file for complete search history.

(56) References Cited

U.S. PATENT DOCUMENTS 4,307,325 A * 12/1981 Saar ........................... 388/809
4,410,846 A * 10/1983 Gerber et al. ............... 318/490
4,636,961 A 1/1987 Bauer
4,669,319 A * 6/1987 Heyraud .................. 73/862.23
5,105,130 A * 4/1992 Barker et al. ............... 318/268
5,440,215 A * 8/1995 Gilmore ...................... 318/432
5,563,482 A * 10/1996 Shaw et al. ................. 318/272
6,060,850 A 5/2000 Sakabe
6,378,623 B2 * 4/2002 Kawarai ..................... 173/180
6,607,041 B2 * 8/2003 Suzuki et al. .................. 173/4
6,834,730 B2 * 12/2004 Gass et al. ...................... 173/2
6,960,894 B2 * 11/2005 Carusillo et al. ........... 318/138
7,088,066 B2 * 8/2006 Haller ........................ 318/432
7,093,668 B2 * 8/2006 Gass et al. ...................... 173/2
7,121,358 B2 * 10/2006 Gass et al. ...................... 173/2
2003/0196824 A1 10/2003 Gass et al.
2004/0159449 A1 8/2004 Leitenberger et al.

FOREIGN PATENT DOCUMENTS

| | | | |
|---|---|---|---|
| DE | 33 29 971 | A1 | 3/1985 |
| DE | 198 08 671 | A1 | 9/1998 |
| DE | 199 30 435 | C1 | 7/2000 |
| DE | 100 23 174 | A1 | 11/2001 |

* cited by examiner

*Primary Examiner*—Lincoln Donovan
*Assistant Examiner*—Eduardo Colon
(74) *Attorney, Agent, or Firm*—Michael J. Striker

(57) ABSTRACT

The invention relates to an electric power tool having a control and/or regulating device for an electric motor. It is provided that the control and/or regulating device (4) is assigned an electronic memory element (5) for at least one operating state of the electric motor (1).

10 Claims, 2 Drawing Sheets

ELECTRIC POWER TOOL WITH MEMORY CAPABILITY

CROSS-REFERENCE TO OTHER APPLICATIONS

This application claim priority to German Patent Application 102004003191.6, filed Jan. 22, 2004.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The invention relates to an electric power tool as generically defined by the preamble to claim 1.

2. Description of Related Art

Prior Art

Electric power tools are equipped with regulating and/or control devices, particularly to enable work to suit the material. For a long time, for instance, it has been known to equip electric power tools with a speed regulator. In particular, speed regulators are known from the prior art that via a so-called accelerator switch permit a slow startup and, in the course of continued actuation of the accelerator switch, an increase in the rotary speed up to the maximum rpm possible for the motor. These speed regulators make gentle startup of the machine possible, which leads to a more-precise onset of the work (beginning to drill, beginning to saw, or the like). Moreover, both the electric motor of the electric power tool and the moving mechanical parts of the electric power tool, such as gears, are protected. At the same time, the gentle startup means that the electric power tool's power supply, for instance the household electrical system, is not loaded by a high startup current.

These speed regulators also to a certain extent enable setting and/or specifying a working rotary speed appropriate for the material. Precisely in the accelerator switches known from the prior art, however, this setting is intrinsically possible only imprecisely and in a poorly replicable way. In particular, it cannot be assured that the user will press the accelerator switch in to the same depth each time, which means that upon each actuation a different rotary speed is set.

Moreover, setting devices for rotary speed regulation are known that combine the aforementioned accelerator switch with a control wheel, which allows the preselection of a certain maximum rpm. A disadvantage here, however, is that the rotary speed setting or specification cannot be done variably and arbitrarily, but instead can be done only by means of preselection at the control wheel, which as a rule is done with the power tool off. In particular, it is not possible as a rule to preselect especially low or especially high rotary speeds using the setting device.

From German Patent DE 199 30 435 C1, an electronic rotary speed controller is known that makes it possible to establish a preselected rotary speed. Here, via an accelerator switch, a rotary speed is preselected and is established by actuation. After that, this rotary speed is maintained constantly until the power tool is switched off. Accordingly what takes place is a preselection of a constant rotary speed that is determined beforehand from a rotary speed range.

BRIEF DESCRIPTION OF THE INVENTION

By comparison, the invention offers the advantage that via an accelerator switch, the entire rotary speed spectrum of the electric motor can be set. By actuation of a device, the rotary speed value applicable at the instant of actuation is taken over into a memory element, which is assigned to the control and/or regulating device of the electric power tool. Between the "off" state (rpm=0) and this preselected rotary speed, the entire rpm range can now be set, up to the attainment of the preselected rpm, by actuation of the accelerator switch. The specified values stored in memory is maintained until either the control and/or regulating device of the electric power tool is reset by the user, by means of a device provided for the purpose, or the electric power tool is disconnected from the supply voltage.

Switching the tool on and off leaves the memorized specified value unchanged (in contrast to DE 199 30 435 C1, in which the preselected constant rotary speed is erased every time the tool is turned off).

It is therefore possible to pass through the entire rpm range multiple times in succession, which makes a gentle startup of the electric power tool, in a way that protects both the current circuit and material, possible as well as reliable reproduction of the preset maximum rpm, and thus moreover allows machining that is appropriate for the material. This is helpful above all whenever a large number of identical or similar workpieces have to be machined in succession.

For that purpose, it is provided that the control and/or regulating device for the electric motor of the electric power tool is assigned an electronic memory element for at least one operating state of the electric motor. The memory element may be integrated with the control and/or regulating device.

The control and/or regulating device here is in particular a speed regulator.

In a preferred embodiment of the invention, the control and/or regulating device is embodied as a db. In an especially preferred embodiment, it is a microcontroller.

To simplify manipulation by the user, in a further embodiment of the invention it is provided that the control and/or regulating device is assigned a display element, which displays the instantaneous value, just then brought about by the user, for instance by means of an accelerator switch, of whatever operating state of the power tool has just been brought about, or in particular the rpm. As a result, it is very simple for the user to tell the rotary speed he is using at the moment. The display is advantageously embodied as a digital numerical display, which permits a direct readout of the applicable value. It is also possible to provide the display as a bar display, from which the user can tell in analog fashion where the present value is located within the setting range. A combination of the two forms of display is especially advantageous.

It is also provided that the status of the memory element be signalled to the user by means of a display, such as a light-emitting diode or LED:

- if the LED lights up, this means a memorized value is present;

- if LED fails to light up, this accordingly means no memorized value is present; a maximum rpm is possible.

In a preferred embodiment of the invention, the control and/or regulating device is a phase controller, which not only allows sensitive metering of the motor output power and of the rotary speed but also enables keeping the power constant under load.

In a simplified way, the method for guiding the operation of the electric motor of the electric power tool can be described such that by means of a setting element, a certain rotary speed is specified, and this rotary speed is taken over into a memory element. The thus-memorized rotary speed is taken over as a maximum rpm upon each further actuation of the setting element (for instance, the accelerator switch); higher rotary speeds than those stored in the memory element are accordingly also possible even if the accelerator switch is pulled all the way out. The range between rotary speed n=0 (that is, the "off" operating state) and the maximum rpm stored in the memory element can be set arbitrarily by the user over the course of the entire actuation travel of the setting element (that is, for instance of the accelerator switch).

A preferred embodiment of this method for guiding the operation of an electric motor of an electric power tool provides that the control and/or regulating device is initialized and/or the memory element is erased when the electric power tool, after disconnection from its power supply is for the first time again acted upon by the supply voltage, and in particular accordingly when after being disconnected from the electrical system it is plugged back in again for the first time. In this state, the entire power and rpm range of the electric motor is available to the user. By actuating the accelerator switch, he can set any arbitrary rotary speed that the electric motor makes possible, from the operating state "off" (rotary speed n=0) up to the maximum output power (rotary speed n=max). Accordingly, the actuation travel of the setting element (that is, for instance the accelerator switch) is designed and scaled such that in the non-pressed state, the rotary speed n=0 ("off") prevails, while in the completely depressed state it is the rotary speed n=max (maximum rpm). Within this range, by actuating the setting element (the accelerator switch) the user can now select an arbitrary rotary speed, and the entire rotary speed range that the power tool is capable of outputting is available to him. While the setting element is kept uniformly pressed, the control and/or regulating device keeps the rotary speed constant. If the user actuates the actuation element at a certain instantaneous rpm, this instantaneous rpm is taken over into the memory element associated with the control and/or regulating device and kept as long as the accelerator switch stays depressed. Simultaneously, the actuation travel of the setting element (that is, the accelerator switch) is rescaled; in the non-depressed state, what is set is the operating state "off" (rotary speed n=0) and in the maximally depressed state, the rotary speed n="memorized instantaneous rpm"="rpm stored in the memory element". This resealing of the rpm setting, or the setting of the motor output power, is the basis every time the setting element is actuated again. The instantaneous rpm stored in memory previously by the user by actuation of an actuation element is accordingly reproduced as the maximum rpm and as a final value of the actuation travel of the setting element. Higher rotary speeds than those stored previously in the memory are accordingly no longer attainable even if the setting element (the accelerator switch) is depressed all the way.

If the user wants to set a higher rotary speed again, or if he wants to set a higher rotary speed an also wants to store it as a maximum rpm, then he must either, as in the first of the method steps recited above, disconnect the electric power tool from the power supply and connect it again, whereupon the electric power tool is initialized and the memory element is erased, or he must erase the previously selected maximum rpm and scaling of the operation course of the setting element by means of an actuation element, which brings about the initialization and the erasure of the memory element.

BRIEF DESCRIPTION OF THE SEVERAL VIEWS OF THE DRAWINGS

The invention is described in further detail below in conjunction with drawings.

Shown are.

DETAILED DESCRIPTION OF THE INVENTION

Figure 1:
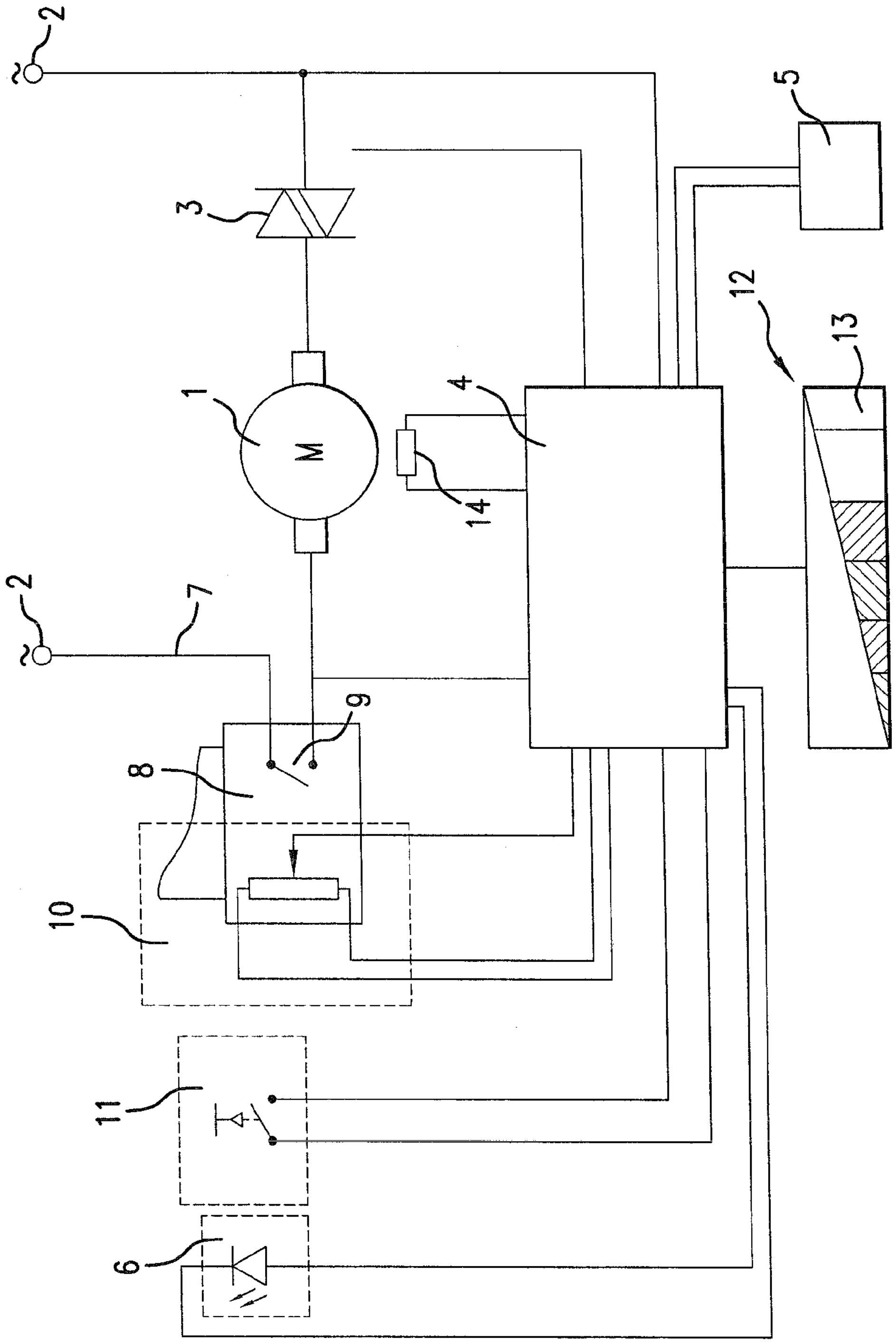
FIG. 1, a schematic illustration of an electric power tool with a control and/or regulating device (block circuit diagram)

FIG. 1, in a basic block diagram, shows an electric motor 1 of an electric power tool, not further shown. The supply voltage is delivered to the electric motor via the terminals 2. The supply voltage delivered as operating voltage to the motor is regulated in the usual way by a triac 3, which is assigned to a control and/or regulating device. The control and/or regulating device 4 is assigned a memory component 5, whose operating state is signalled via a light-emitted diode or LED 6. In the supply voltage lead 7, there is a switch element embodied as an accelerator switch 8, which includes an on/off switch element 9 and a setting element 10. The on/off switch element 9 switches the supply voltage on or off, while the setting element 10 is assigned to the control and/or regulating device 4. Also assigned to the control and/or regulating device 4 is an actuation element 11, which is embodied here as a feeler. The control and/or regulating device 4 is also assigned an rpm sensor 14, which furnishes a signal that is proportional to the rotary speed, or rpm. Also associated with the control and/or regulating device is a display element 12, which displays whatever state prevails at the time, namely in this case the rpm just now prevailing. The display element 12 is embodied here as an analog bar display 13, on which whatever rpm prevails just now can be read off from the left-hand edge as a minimum rotary speed display position to the right-hand edge as a maximum rpm display position; this form of display allows an overview of the rpm range of the electric motor 1 that has already been used or that is still available.

Upon subjection to supply voltage via the connection terminals 2 after disconnection from the supply voltage, the control and/or regulating device 4 is initialized and the memory element 5 is erased; a defined outset state of the control and/or regulating device and of the memory element thus exists, such that the control and/or regulating device 4 makes the entire power and rpm range of the electric motor 1 available, but only as a function of the extent to which the setting element 10 in the accelerator switch 8 is actuated. When the accelerator switch 8 is depressed by the user, the operating current is made available via the on/off switch element 9, and via the setting element 10 and the control and/or regulating device 4 in conjunction with the triac 3, the motor power or the rotary speed of the electric motor 1 is regulated. The rotary speed prevailing in this state is detected by the rpm sensor 14 and shown to the user on the bar display 13 of the display element 12. By actuation of the actuation element 11, which is embodied as a feeler, the presently prevailing rpm value of the electric motor 1 is taken over into the memory element 5. The storage of this value in memory is signalled to the user by means of the LED 6. The next time the actuation element 11 is actuated again, a new rpm value just then prevailing is stored in memory, and this rpm value can at most be the rpm value already stored previously. Actuating the actuation element 11 twice within a time slot defined in the control and/or regulating device 4 erases the rpm value stored in the memory element 5, and the LED 6 goes out.

The modes of operation described above may be implemented either as described with regard to detecting the rpm using an rpm sensor 14 or by means of continuous measurement of the voltages of the electric motor, or in other words indirectly, in which case the rpm sensor as a separate component is omitted. The embodiment with an rpm sensor 14 is more precise, but somewhat more expensive than the variant with indirect measurement via the voltage of the electric motor.

Figure 2:
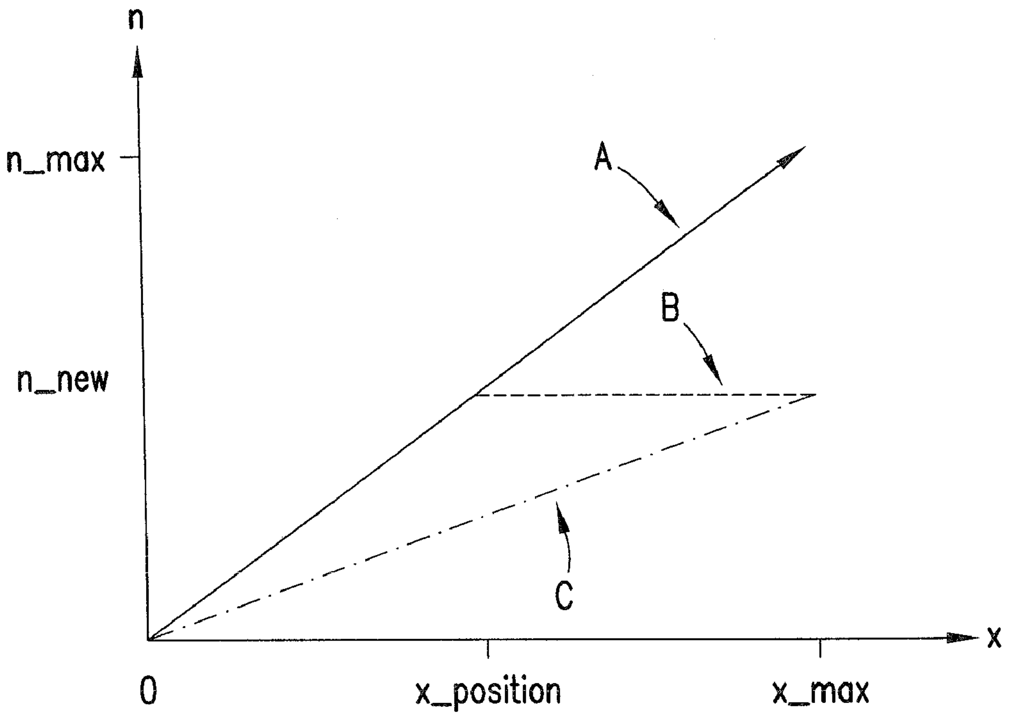
FIG. 2, the scaling/rescaling of the actuation travel of the setting element (the accelerator switch).

FIG. 2, within a coordinate system, shows the dependency of the rotary speed, or rpm, n of the electric motor 1 as a function of the actuation travel x of the setting element 10 embodied as an accelerator switch 8. The straight line A shows the initial line, which is the rotary speed course from n=0 to $n=n_{max}$ in the initialized state of the control and/or regulating device 4 and of the memory element 5. This is the rotary speed course which results in the initialized state as a function of the actuation travel x, namely an essentially linear traversal through the entire rpm range possible for the electric motor 1, up to its maximum power output. In the course of the actuation of the setting element 10 designed as an accelerator switch 8 along the actuation travel between $x_0$ to $x_{max}$, the result at an arbitrary intermediate position $x_{stell}$ is a rotary speed $n_{neu}$, whose level is shown as the straight line B in the graph. If by actuation of the actuation element 11 this rotary speed level $n_{neu}$ is taken over into the memory element 5, then even upon further actuation of the setting element 10 via the accelerator switch 8, the rotary speed level (curve B) no longer changes along the actuation travel x. If the setting element 10 is reset to its state of repose or OFF state by release of the accelerator switch 8, the control and/or regulating device 4 causes a resealing of the actuation travel x to take place, such that upon an essentially linear traversal of the actuation travel from 0 to $x_{max}$, a rotary speed of from n=0 to $n=n_{neu}$ is ensues (curve C). For the essentially linear traversal of the rpm range from n=0 to $n=n_{neu}$, accordingly the entire actuation travel of the setting element 10 embodied as an accelerator switch 8 is available, which permits a very much more-sensitive regulation of the rotary speed within the now-available rpm range from n=0 to $n=n_{neu}$. If the electric power tool is disconnected from its supply voltage, the control and/or regulating device 4 is initialized and the memory element 5 is erased; the same thing happens upon a double actuation of this actuation element 11 within a time slot defined in the control and/or regulating device 4. Upon the next imposition of supply voltage, or after double actuation of the actuation element 11, the setting characteristic for the rotary speed n, shown as curve A, is restored, such that in an essentially linear way, the entire rotary speed range from n=0 to $n=n_{max}$ can be traversed, as a function of the actuation travel 0 to $x_{max}$ of the setting element 10 embodied as the accelerator switch 8.

It is understood that it is also possible to use some other regulating characteristic than a linear one, and thus in particular to provide arbitrarily adapted curve courses for the above-described function that are suitable for the particular field in which the electric power tool is used.

The invention claimed is:

1. An electric power tool, having a control and/or regulating device for an electric motor, wherein the control and/or regulating device (4) is assigned an electronic memory element (5) for at least one operating state of the electric motor (1) wherein said operating state is a motor power or a rotary speed of said electric motor (1), said operating state being regulated via a setting element (10) and said control and/or regulating device (4), and wherein an actuation element (11) is provided for taking over an existing operating state as a memorized value of the memory element (5).

2. The electric power tool in accordance with claim 1, characterized in that the memory element (5) is integrated with the control and/or regulating device (4).

3. The electric power tool in accordance with claim 1, characterized in that the control and/or regulating device (4) is a speed regulator.

4. The electric power tool in accordance with claim 1, characterized in that the control and/or regulating device (4) is a digital component, in particular a microcontroller.

5. The electric power tool in accordance with one claim 1, characterized in that the control and/or regulating device (4) is a display element (12) for displaying an instantaneous value, in particular the instantaneous value of the rotary speed.

6. The electric power tool in accordance with claim 1, characterized in that the memory element is assigned a display element (6) for displaying its operating state.

7. The electric power tool in accordance with claim 1, characterized in that the control and/or regulating device (4) is a phase controller.

8. A method for guiding the operation of an electric motor of an electric power tool, in particular in accordance with claim 1, including the following steps:

specifying a defined rotary speed at a setting element (10);
storing this rotary speed in a memory element (5);
reproducing the stored rotary speed as a maximum rpm upon each further actuation of the setting element (10).

9. A method for guiding the operation of an electric motor of an electric power tool having a control and/or regulating device for an electric motor, wherein the control and/or regulating device (4) is assigned an electronic memory element (5) for at least one operating state of the electric motor (1), including the following steps:

initializing the control and/or regulating device (4) and/or erasing the memory element (5) upon a first and/or renewed exposure to supply voltage after disconnection from the supply voltage and/or by a user;
scaling an actuation travel of a setting element for rotary speeds of n=0 (off) to n=max (maximum rpm);
setting and/or regulating the rotary speed as a function of the actuation of the setting element (10) by the user;
storing the instantaneous rpm as a result of actuation of an actuation element (11) by the user;
rescaling the actuation travel of the setting element (10) from n=0 (off) to n=memorized instantaneous rpm;
reproduction of the memorized instantaneous rpm as a final value of the actuation travel of the setting element (10).

10. An electric power tool comprising:

a control and/or regulating device for an electric motor (4), an electronic memory element (5), a setting element (10), and an actuation element (11) wherein:

the control and/or regulating device (4) is assigned an electronic memory element (5) for at least one operating state of the electric motor (1);

the control and/or regulating device (4) and/or erasing the memory element (5) is initialized upon a first and/or renewed exposure to supply voltage after disconnection from the supply voltage and/or by a user;

an actuation travel of the setting element (10) is scaled for rotary speeds of 0 to a maximum rpm;

the rotary speed of the electric motor is set and/or regulated as a function of the actuation of the setting element (10);

the instantaneous rpm is stored as a result of actuation of the actuation element (11);

the actuation travel of the setting element (10) is rescaled from 0 to memorized instantaneous rpm; and the memorized instantaneous rpm is reproduced as a final value of the actuation travel of the setting element (10).

* * * * *